US011070770B2

(12) United States Patent
Fridental et al.

(10) Patent No.: US 11,070,770 B2
(45) Date of Patent: Jul. 20, 2021

(54) METHOD AND SYSTEM FOR AUTO-CALIBRATION OF MULTIPLE SENSORS FOR EVENT TRACKING

(71) Applicant: ANTS TECHNOLOGY (HK) LIMITED, Hong Kong (HK)

(72) Inventors: Ron Fridental, Shoham (IL); Mica Arie-Nachimson, Givat-Brener (IL); Assaf Arbelle, Beer-Sheva (IL)

(73) Assignee: ANTS TECHNOLOGY (HK) LIMITED, Hong Kong (HK)

( * ) Notice: Subject to any disclaimer, the term of this patent is extended or adjusted under 35 U.S.C. 154(b) by 0 days.

(21) Appl. No.: 16/748,918

(22) Filed: Jan. 22, 2020

(65) Prior Publication Data
US 2021/0105443 A1  Apr. 8, 2021

Related U.S. Application Data

(60) Provisional application No. 62/911,378, filed on Oct. 7, 2019.

(51) Int. Cl.
| | |
|---|---|
| *H04N 19/61* | (2014.01) |
| *H04N 19/196* | (2014.01) |
| *H04N 19/132* | (2014.01) |
| *H04N 19/513* | (2014.01) |
| *H04N 19/159* | (2014.01) |
| *H04N 19/119* | (2014.01) |
| *H04N 19/137* | (2014.01) |
| *H04N 19/176* | (2014.01) |
| *H04N 19/52* | (2014.01) |
| *H04N 19/46* | (2014.01) |
| *H04N 7/18* | (2006.01) |
| *G08B 29/20* | (2006.01) |
| *H04N 5/232* | (2006.01) |

(52) U.S. Cl.
CPC ............. *H04N 7/188* (2013.01); *G08B 29/20* (2013.01); *H04N 5/23218* (2018.08); *H04N 7/181* (2013.01)

(58) Field of Classification Search
None
See application file for complete search history.

(56) References Cited

U.S. PATENT DOCUMENTS

| | | | | |
|---|---|---|---|---|
| 7,738,008 | B1* | 6/2010 | Ball | G06K 9/00771 348/159 |
| 8,179,441 | B2* | 5/2012 | Yen | G06K 9/00771 348/159 |
| 2016/0014305 | A1* | 1/2016 | Schlattmann | G06K 9/00758 348/515 |
| 2017/0371353 | A1* | 12/2017 | Millinger, III | G01S 5/0263 |
| 2018/0308243 | A1* | 10/2018 | Justice | G06T 7/246 |
| 2019/0258864 | A1* | 8/2019 | Lee | H04N 7/181 |

* cited by examiner

*Primary Examiner* — Edemio Navas, Jr.
(74) *Attorney, Agent, or Firm* — Soroker Agmon Nordman (57) ABSTRACT

A method for multiple sensor calibration and tracking, the method including identifying a non-permanent object in a first field of detection (FOD) of a sensor, wherein the sensor is one of a plurality of sensors positioned in various locations at a site, each sensor has a corresponding FOD; tracking the identified object by single-sensor tracking in the first FOD; predicting appearance of the object, and based on the predictions initiating single-sensor tracking in at least one other FOD where it is predicted that the object will appear; and outputting data captured from the tracked FODs.

18 Claims, 6 Drawing Sheets

METHOD AND SYSTEM FOR AUTO-CALIBRATION OF MULTIPLE SENSORS FOR EVENT TRACKING

BACKGROUND

In recent years, cameras are commonly placed in large public and private areas, and are mainly used for security. As every camera has a limited field of view, multiple cameras are placed to expand the covered area. An important capability of such a system is multiple object tracking. While tracking in a single video is a well-studied problem, these methods do not generalize to a multiple camera setting. In such a scenario, it is required to obtain some calibration in order to successfully track across the whole system. Current methods rely on additional information such as blueprints, manual calibration, pre-defined installation specifics, etc.

SUMMARY

An aspect of some embodiments of the present disclosure provides a method for multiple sensor calibration and tracking, the method comprising: identifying a non-permanent object in a first field of detection (FOD) of a sensor, wherein the sensor is one of a plurality of sensors positioned in various locations at a site, each sensor has a corresponding FOD; tracking the identified object by single-sensor tracking in the first FOD; predicting appearance of the object, and based on the predictions initiating single-sensor tracking in at least one other FOD where it is predicted that the object will appear; and outputting data captured from the tracked FODs.

Optionally, the predicting includes predicting leaving of the site by the identified object.

Optionally, the predicting includes predicting appearance of the object in at least one other FOD that is overlapping with the first FOD.

Optionally, the method includes generating an alert in case the object does not appear in the predicted FODs within a predicted timeframe, or in case the object appears in unpredicted FODs or timeframe.

Optionally, in case the object disappears from the first FOD, predicting appearance of the object, and based on the prediction switch to single-sensor tracking in at least one other FOD where there is a high probability that the object will appear, and switching to outputting data captured from the tracked FODs.

Optionally, the method includes identifying the object in the at least one other FOD by a module configured to identify non-permanent objects through drastic appearance changes.

Optionally, the method includes predicting, by a mapping module, in which of the at least one other FOD an object will reappear after disappearing from a section of the first FOD.

Optionally, the method includes predicting, by the mapping module, where in the at least one other FOD the object will reappear.

Optionally, the method includes predicting, by the mapping module, when the object will reappear.

Optionally, the method includes mapping the site based on object reappearance patterns, the mapping predicts if, when or where in the site an object will reappear after disappearing from a certain location in the site.

Optionally, the method includes learning to predict in which FOD an object will reappear after disappearing from a section of the first FOD, by: detecting when any non-permanent object disappears from a certain section of the first FOD; after the disappearance, detecting appearance of the same or another non-permanent object in at least one other section of the same or another FOD, within a certain range of time after the disappearance; counting, separately for each of the FOD sections, each time any non-permanent object appears in this FOD section within a certain range of time after any non-permanent object disappears from the certain section; and based on the counting, in case of high counts in a specific FOD section, identifying the specific FOD section as having high probability that any non-permanent object will reappear in this specific FOD section within the certain range of time after disappearing from the certain section.

Optionally, the method includes calculating a plurality of possible paths of the non-permanent object across the various FODs, the path includes certain sensor FODs in a certain chronological order, wherein it is probable that the selected object will be located in these certain FODs in the certain chronological order; and calculating a score for each calculated path, according to the probability of the object making this path.

Optionally, the method includes iteratively calculating for each FOD section a score for other FOD sections according to the probability that the other FOD sections will be next in a possible path of the object.

Optionally, the method includes identifying overlapping areas between the FODs.

Optionally, the method includes counting when a non-permanent object is detected in two FODs at the same time, and identifying as overlapping areas, areas covered by respective two sections of the two FODs having high counts of simultaneous detections of non-permanent objects.

Optionally, the method includes given a selected non-permanent object tracked in a selected FOD in a selected time slot, identifying the same or other non-permanent objects that appear simultaneously in other FODs, at the selected time slot and/or at other time slots before and/or after the selected time slot; and identifying if the same or other non-permanent objects are the same selected non-permanent object.

Optionally, the method includes detecting simultaneous appearances of non-permanent objects that are either: in overlapping regions between the selected FOD and other FODs in which the object is detected; or in a location of probable reappearance correlated with a previous FOD in which the object was detected; or that are identified as the same object according to a representation, for example visual appearance and/or other detected features.

Optionally, the method includes identifying non-permanent objects that crosses between spatiotemporal correlated FOD sections; and verifying the identification of the crossing non-permanent objects by matching the representations, for example visual appearance and/or other detected features of identified objects.

BRIEF DESCRIPTION OF THE DRAWINGS

Some non-limiting exemplary embodiments or features of the disclosed subject matter are illustrated in the following drawings.

In the drawings.

With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described. References to previously presented elements are implied without necessarily further citing the drawing or description in which they appear.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

DETAILED DESCRIPTION

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Some embodiments of the present disclosure provide a system and method for multiple sensor calibration and tracking. The sensors, for example cameras, may be sense objects in a certain site. For example, the provided method includes learning both the sensor setting and the typical appearance of the tracked objects by passively observing the scene, as described in more detail herein below.

Therefore, by the provided system and method, some embodiments of the present invention yield a solution to the problem of tracking across multiple sensors or cameras in an arbitrary setting, without the necessity of additional input of, for example, blueprints, manual calibration, pre-defined installation specifics and/or pre-known sensor or camera locations or orientations.

Figure 1:
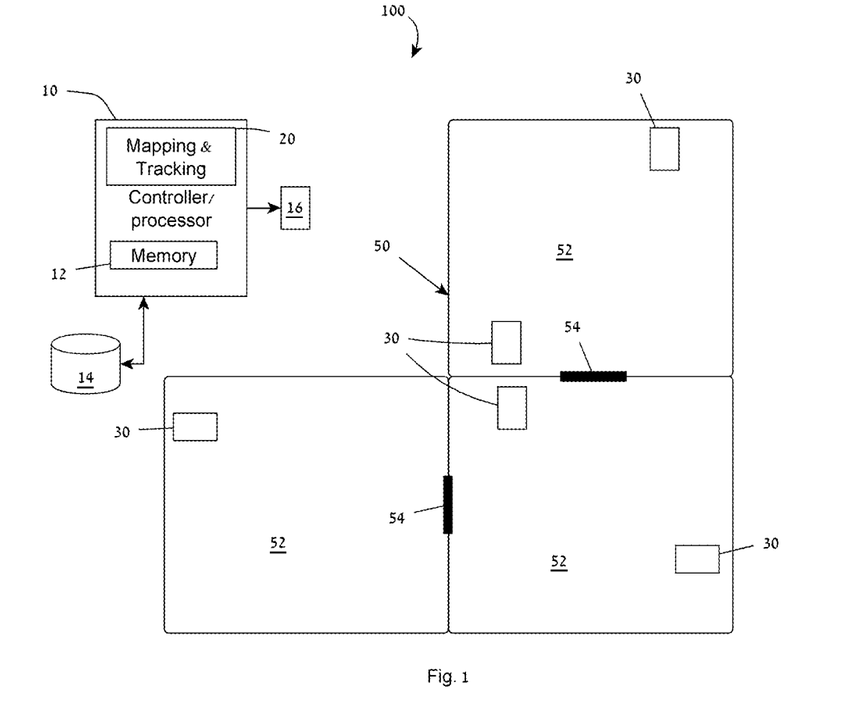
FIG. 1, which is a schematic illustration of a system for multiple sensor calibration and tracking, according to some embodiments of the present disclosure.

Reference is now made to FIG. 1, which is a schematic illustration of a system 100 for multiple sensor calibration and tracking, according to some embodiments of the present disclosure. System 100 may include a controller/processor 10 and a plurality of object sensors 30. Object sensors 30 may include image sensors, for example, video cameras. Additionally, or alternatively, in some embodiments of the present invention, at least some of sensors 30 may include heat detectors, sonars, volume sensors, light sensors, depth sensors, sound sensors, motion sensors and/or any other suitable detectors. Object sensors 30 may be positioned at a plurality of corresponding locations at spaces 52 of a site 50. For example, the fields of detection (FODs, for example a field of view of a camera) of at least some of sensors 30 do not overlap. For example, the FODs of some of sensors 30 partially overlap. In some embodiments, there is no overlap between any of the FODs of sensors 30. For example, spaces 52 are be different rooms and/or areas of site 50, and/or at least some of sensors 30 are located in different rooms and/or areas of site 50. Site 50 may include walls, doors and/or barriers 54 that separate and/or enable passing between spaces 52. Sensors 30 may be arbitrarily placed and/or may sense and/or record image and/or other sensor data simultaneously, from different areas of site 50. According to some embodiments, there are no pre-defined requirements on the locations and/or orientations of sensors 30 or on overlapping FODs. In addition, part of the FOD may be occluded for example due to obstacles in the spaces.

Processor/controller 10 may include, control and or communicate with a mapping and tracking module 20, storage medium 12, a database 14, an output device 16 and object sensors 30, for example to execute the methods described herein, for example according to instructions stored in storage medium 12. For example, storage medium 12 is a non-transitory memory storing code instructions executable by processor 10. When executed, the code instructions cause processor 10 to carry out the methods as described in detail herein. Processor 10 may execute, run and/or control a mapping and tracking module 20. According to some embodiments of the present disclosure, mapping and tracking module 20 of processor 10 is configured to classify data and/or to detect certain states, and/or any other suitable target task, for example as required by the method described herein. In some embodiments, mapping and tracking module 20 is configured to be trained to perform and/or enhance performance of the classifying, detecting, and/or another suitable task. For example, mapping and tracking module 20 includes machine training and/or artificial intelligence capabilities, such as artificial neural networks.

Output device 16 may include a display and/or a speaker and/or any other suitable output device. Output device 16 may be used by processor 10 to output captured FODs images and/or other data and/or provide indications and/or alerts. For example, processor 16 may display by output device 16 the FODs where a selected object appears and/or is predicted to appear, as described in more detail herein.

It will be appreciated that, in some embodiments of the present disclosure, at least some operations and/or processes, described throughout the present disclosure as performed by processor 10 and/or module 20 and/or its sub-modules described herein, may be performed, at least partially, at and/or by the plurality of sensors 30 or at least one of sensors 30. Sensors 30 may include processing units and/or may communicate with each other and/or with processor 10 to communicate data and/or results of calculations, processing, detections, and/or tracking, and/or any other suitable information.

Figure 2:
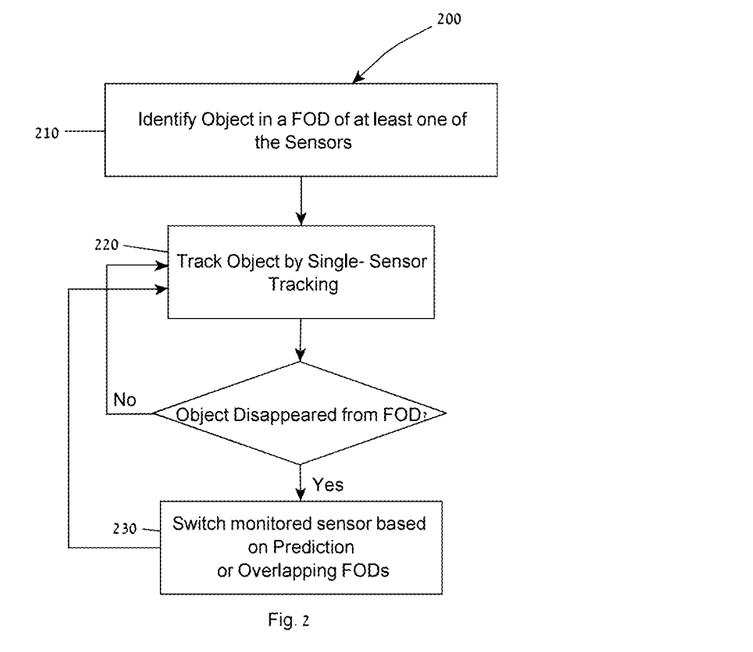
FIG. 2 is a schematic illustration of a method for multiple sensor tracking, according to some embodiments of the present disclosure.

Reference is now made to FIG. 2, which is a schematic illustration of a method 200 for multiple sensor tracking, according to some embodiments of the present disclosure. As indicated in block 210, during operation, processor 10 may identify an object in an FOD of at least one of sensors 30. For example, a user may define and/or indicate a specific object or object type, and processor 10 may identify the indicated object in an FOD of at least one of sensors 30. In some embodiments, a user may indicate an object in an FOD of a sensor 30, and processor 10 may identify the same object in an FOD of another sensor 30. As indicated in block 220, processor 10 may track the identified object by single sensor tracking, over time and space. For example, for each sensor FOD in which the object is identified, a corresponding tracking is performed of the identified object in the respective sensor FOD. The tracking may be performed over a determined period of time and/or until the object is not detected in site 50 and/or in any of the FODs of sensors 30 for a certain period of time. For example, the tracking may be performed by repeating detection of the object in the respective FODs, for example until the object disappears from an FOD, e.g. not detected anymore in a certain FOD of sensor 30.

As indicated in block 230, in case the object disappears from an FOD of a certain sensor 30, processor 10 may predict appearance of the object, e.g. predict if, where and/or when the object will most probably appear in at least one FOD of at least one respective sensor 30. In some cases, when the object disappears from an FOD of a certain sensor 30, it appears in overlapping FOD sections of other sensors 30. Accordingly, in case the object disappears from an FOD of a certain sensor 30, processor 10 may find and/or predict if the object appears in an overlapping FOD section of another sensor, and/or in which overlapping FOD section of another sensor the object will appear and/or is predicted to appear. In some embodiments, processor 10 may predict that the object left the site, e.g. will probably not appear in any of the FODs within a certain timeframe. The appearance of the object may be reappearance of the object in a non-overlapping region of another FOD, or appearance of the object in an overlapping region of another FOD, after disappearing from the certain FOD. Based on the prediction, processor 10 may switch to monitoring the sensors 30 in whose FOD the object will most probably appear, e.g. proceed with the tracking in at least one FOD where the object will most probably appear next. In some embodiments, in case the object appears in an overlapping area in several FODs of one or more sensors 30, processor 10 may additionally monitor the relevant sensors 30.

In some embodiments of the present disclosure, processor 10 may control sensors 30 according to the location prediction. For example, processor 10 may activate, deactivate, and/or change functionality, configuration and/or designation of a sensor 30 based on prediction that an object will appear/disappear from an FOD section of the sensor 30, for example based on features of the appearing/disappearing object.

In some embodiments of the present invention, in case the object does not appear in the predicted FODs within the predicted timeframe, and/or in case the object appears in unpredicted FODs and/or timeframe, processor 10 may identify a suspicious activity and/or event and/or generate an indication and/or alert that an unpredicted event occurred. In some embodiments, processor 10 may identify and/or alert when a sensor malfunctions, for example based on unpredicted appearances of objects and/or non-appearances of objects despite prediction. For example, processor 10 may output indications and/or alerts by output device 16.

According to some embodiments of the present disclosure, as described in more detail herein below, processor 10, by module 20, detects objects in image or sensor data captured by sensors 30 and uses this data to learn both the spatiotemporal and appearance correlations between object detections. For example, processor 10, by mapping and tracking module 20, identifies the overlapping regions between FODs of sensors 30 and non-overlapping correlated areas in the FODs, and learns to predict reappearance of detected objects using spatiotemporal information. Processor 10, by module 20, may learn the appearance and reappearance properties of detected objects, and use spatiotemporal and visual cues to track objects across the scene of site 50 on multiple uncalibrated cameras or sensors 30. Mapping and tracking module 20 may include software and/or hardware components controllable by sensor 10, for example to perform the methods described herein. Module 20 may include and/or integrate information produced by a plurality of sub-modules to perform some aspects of the present disclosure, for example as described in more detail herein.

Figure 3:
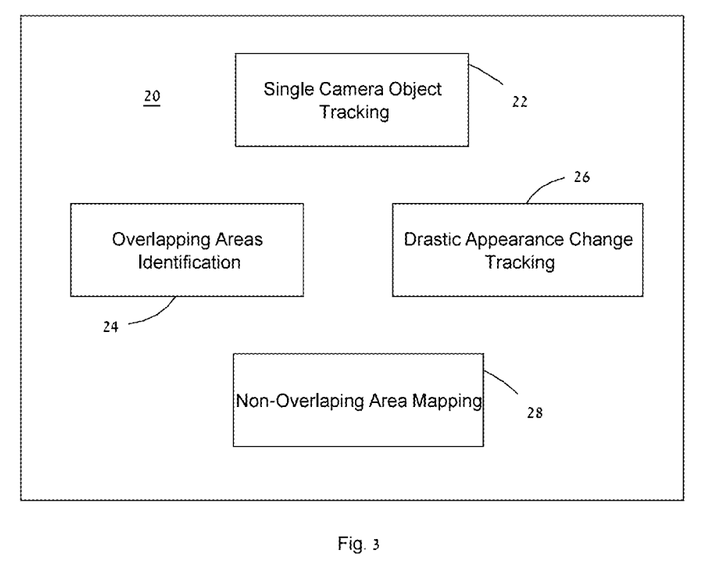
FIG. 3 is a schematic illustration of mapping and tracking module 20 and its sub-modules for multiple sensor tracking, according to some embodiments of the present disclosure.

Reference is now made to FIG. 3, which is a schematic illustration of mapping and tracking module 20 and its sub-modules for multiple sensor tracking, according to some embodiments of the present disclosure. Module 20 may include, control, communicate with and/or integrate information produced by a single-sensor object tracking sub-module 22, an overlapping areas identification sub-module 24, a drastic appearance/representation change tracking sub-module 26 and a non-overlapping area mapping sub-module 28. Single-sensor object tracking sub-module 22 may be configured to track a detected object within an FOD of a single sensor, for example to monitor the object's motions and/or position or location changes within a single-sensor FOD. For example, single-sensor object tracking sub-module 22 may include known single-camera tracking components. Overlapping areas identification sub-module 24 may identify overlapping FOD sections of at least two sensor FODs, if such overlapping areas exist. Drastic appearance/representation change tracking sub-module 26 may identify various detections of the same object as detections of the same object, for example detections before and after a drastic change in the object appearance and/or detected features, for example because of a different position, orientation and/or body gesture of the object and/or because of a different angle of view or angle of detection by sensors 30. Non-overlapping area mapping sub-module 28 may learn to predict in FOD of which sensor 30 and/or if and where in the FOD an object will reappear after disappearing from a certain FOD section of a certain sensor 30. Based on the reappearance patterns, sub-module 28 may map a site 50 by predicting if and where in site 50 an object will reappear after disappearing from a certain location in site 50.

Mapping and tracking module 20 may integrate between sub-modules 22, 24, 26 and 28. For example, after predicting by sub-module 28 reappearance of an object at a certain location in a certain FOD, sub-module 26 may be used to identify the reappearance of the object, for example in the location predicted by sub-module 28. Module 20 may provide an indication about the identified reappearance, for example, to sub-module 22. Sub-module 22 may perform single sensor tracking of the identified reappeared object. In some embodiments, module 20 provides the reappearance identified by sub-module 26 as a training data example and/or for training of non-overlapping area mapping sub-module 28.

Figure 4:
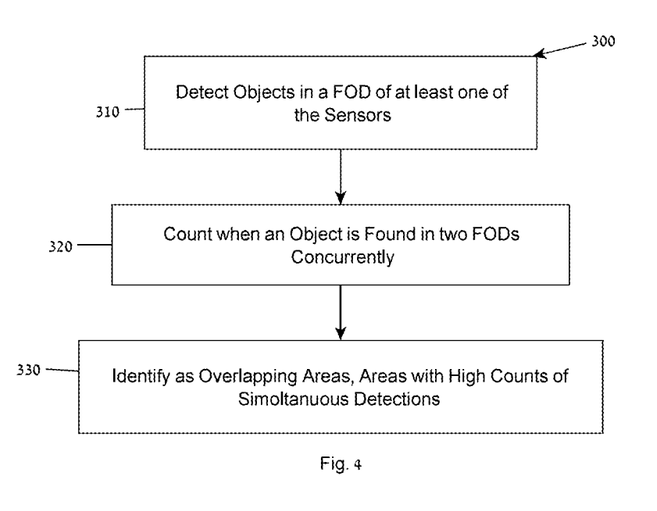
FIG. 4 is a schematic flowchart illustrating a method for identifying overlapping FOD sections of at least two sensor FODs, according to some embodiments of the present disclosure.

Reference is now made to FIG. 4, which is a schematic flowchart illustrating a method 300 for identifying overlapping FOD sections of at least two sensor FODs, according to some embodiments of the present disclosure. For example, some steps of method 300 may be performed by overlapping areas identification sub-module 24. As indicated in block 310, processor 10 may detect non-permanent objects in FODs of sensors 30, for example by single-sensor object tracking sub-module 22. For example, the non-permanent objects may be humans, automatons, animals, and other autonomous and/or mobile objects that are not located permanently and/or fixedly in site 50. For example, processor 10 may divide the FOD of each sensor 30 to sections. When any non-permanent object is detected in the FOD, processor 10 may identify the section or sections of the FOD in which the non-permanent object is detected.

Figure 5A:
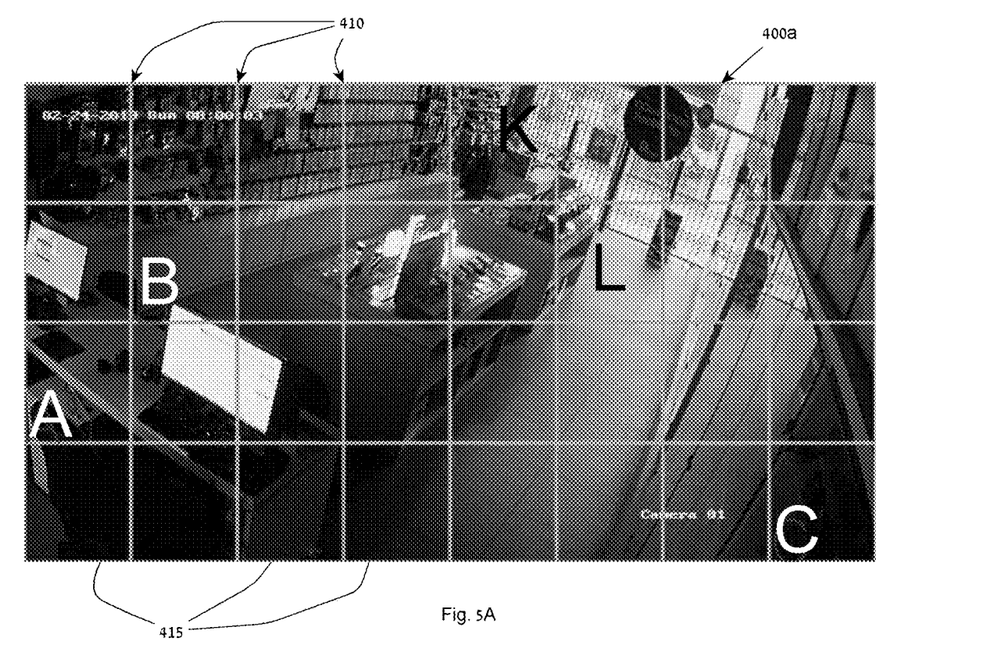
FIGS. 5A and 5B are greyscale image illustrations of exemplary sensor captured scenes 400a and 400b of FODs of two respective sensors, captured by the two respective sensors, according to some embodiments of the present disclosure.
Figure 5B:
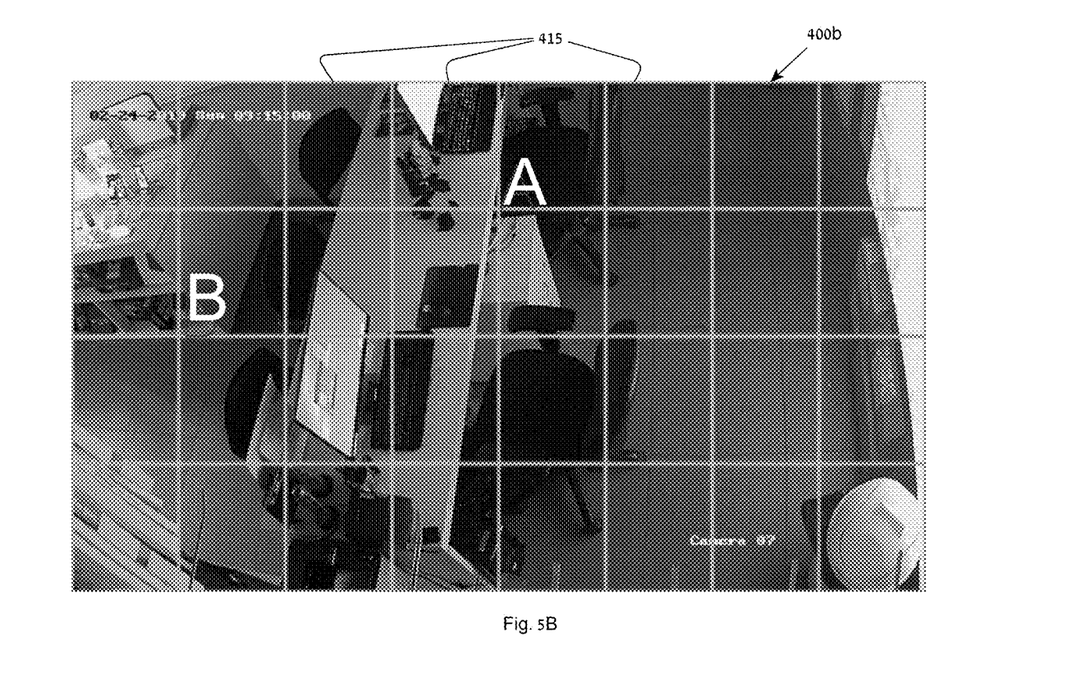

As indicated in block 320, processor 10 may count when any non-permanent object is detected in two FODs of respective two sensors 30 at the same time. Some embodiments of the present disclosure do not require that processor 10 identify that the detected object in both FODs is the same object. For example, processor 10 may identify in which sections of the FODs a non-permanent object is detected. Processor 10 may maintain a counter for each couple of sections of two respective FODs and/or add a count to the counter each time a non-permanent object is detected concurrently in both FOD sections. As indicated in block 330, processor 10 may identify as overlapping areas, areas covered by a couple of sections having high counts of simultaneous detections of non-permanent objects. An example illustrating this process is shown in FIGS. 5A and 5B. In some embodiments, there may be several different sets of FOD divisions with varying size on the same sensor. For example, coarse divisions, fine divisions and non-uniform divisions. Counting area correlations can be modified to include these FOD divisions, for example to detect overlap of areas of different sizes.

Reference is now made to FIGS. 5A and 5B, which are greyscale image illustrations of exemplary sensor captured scenes 400a and 400b of FODs of two respective sensors, captured by the two respective sensors, according to some embodiments of the present disclosure. Processor 10 may divide each captured FOD scene to sections 415, for example by applying a grid 410. For example, scenes 400a and/or 400b are displayed by output device 16.

Processor 10 may identify in scenes 400a and 400b an overlapping region A and an overlapping region B between the respective FODs. Each of regions A and B may be identified in both scenes 400a and 400b in one or more sections 415 of each of scenes 400a and 400b. For example, processor 10 may monitor each scene 400a and 400b single sensor tracking and their synchronous timing of the respective FODs, processor 10 may find correlations between some of sections 415 of the FODs, for example by counting simultaneous detections of non-permanent objects in both FODs. For example, processor 10 may detect non-permanent objects in scenes 400a and 400b, and/or may identify the section or sections 415 in which a non-permanent object is detected. Processor 10 may count when a non-permanent object is detected in both scenes 400a and 400b at the same time. Processor 10 may maintain a counter for a couple of sections 415, each of another one of scenes 400a and 400b, and/or add a count to the counter each time a non-permanent object is detected concurrently in both sections 415. Processor 10 may identify certain sections 415 of different scenes 400a and 400b as capturing the same region of site 50, for example region A or region B, when the corresponding sections 415 have high counts of simultaneous detections. Accordingly, region A and region B are captured in overlapping sections 415 by both sensors 30.

According to some embodiments of the present disclosure, processor 10 may identify non-overlapping sections 415 of different captured scenes as correlated spatiotemporally, for example when processor 10 calculates a strong probability that a tracked object that disappears from a certain section 415 reappears within a certain time range in a different certain section 415. These correlated sections 415 may be, for example, a room connected to a corridor, with a camera viewing the room and another viewing the corridor, multiple cameras in some arrangement as back-to-back, an obstacle blocking part of a camera's view failing the tracker, etc.

Accordingly, for example, non-overlapping area mapping module 28 generates spatiotemporal correlation maps for all sections 415, where a correlation map is learned at every section 415. These correlation maps define the probabilities that an object will reappear at all other time ranges and locations. This allows searching for disappearing objects in the correct spatiotemporal location both inside a single sensor FOD and between a plurality of sensor FODs.

Figure 6:
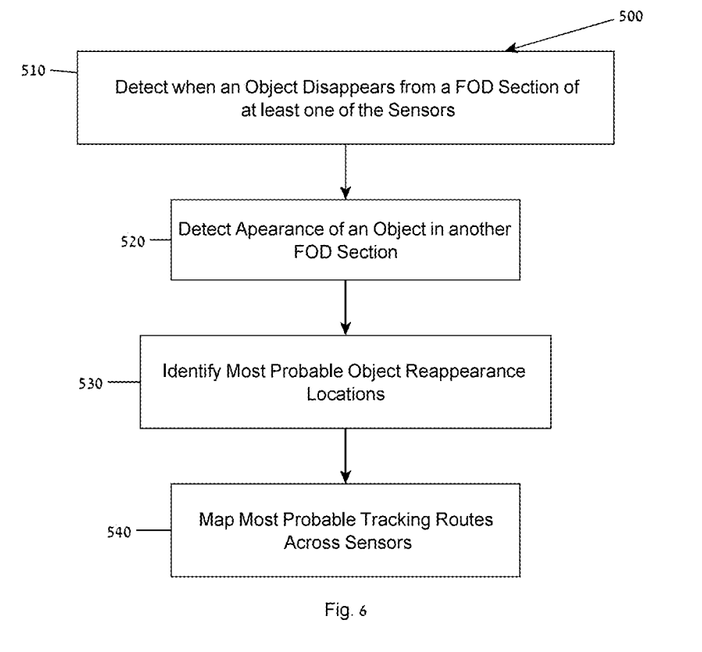
FIG. 6 is a schematic flowchart illustrating a method for mapping of non-overlapping correlated areas, according to some embodiments of the present disclosure.

Reference is now made to FIG. 6, which is a schematic flowchart illustrating a method 500 for mapping of non-overlapping correlated areas, according to some embodiments of the present disclosure. Method 500 may be performed by non-overlapping area mapping module 28. As indicated in block 510, processor 10 may detect when an object disappears from an FOD section 415 of at least one of sensors 30. For example, processor 10 may perform single-sensor tracking by module 22 on separate FODs of a plurality of sensors 30. For each captured section 415, processor 10 may identify when a certain object appears in the section and when the same object disappears from the section. As indicated in block 520, processor 10 may detect appearance of an object in another section 415. For example, once an object disappears in a certain section 415, processor 10 identifies in which section or sections 415 an object appears within a certain range of time after the disappearance. As indicated in block 530, processor 10 may identify, out of the various FODs of the various sensors 30, the sections 415 at which an object will most probably reappear within a certain range of time after disappearing from the certain section 415. For example, processor 10 may count each time an object appears in a section 415 within a determined range of time after disappearance of an object from a certain section 415. Section(s) 415 that have high counts of appearances of objects within a determined range of time after disappearance of an object from a certain section 415 may be determined by processor 10 as correlated to the certain section 415, i.e. as the section or section(s) 415 at which an object will most probably reappear within a certain range of time after disappearing from the certain section 415. As indicated in block 540, based on the identification of most probable reappearance spatiotemporal locations, processor 10 may generate a map of the most probable tracking routes across sensors 30. By this map, processor 10 may be able to track an object across sensors 30, for example as described with reference to FIG. 2. In some embodiments, processor 10 may identify, for example by drastic appearance change tracking module 26, which objects appear in the various FOD sections, and/or verify that an appearing object is a re-appearing object previously disappeared from another section.

Figure 7A:
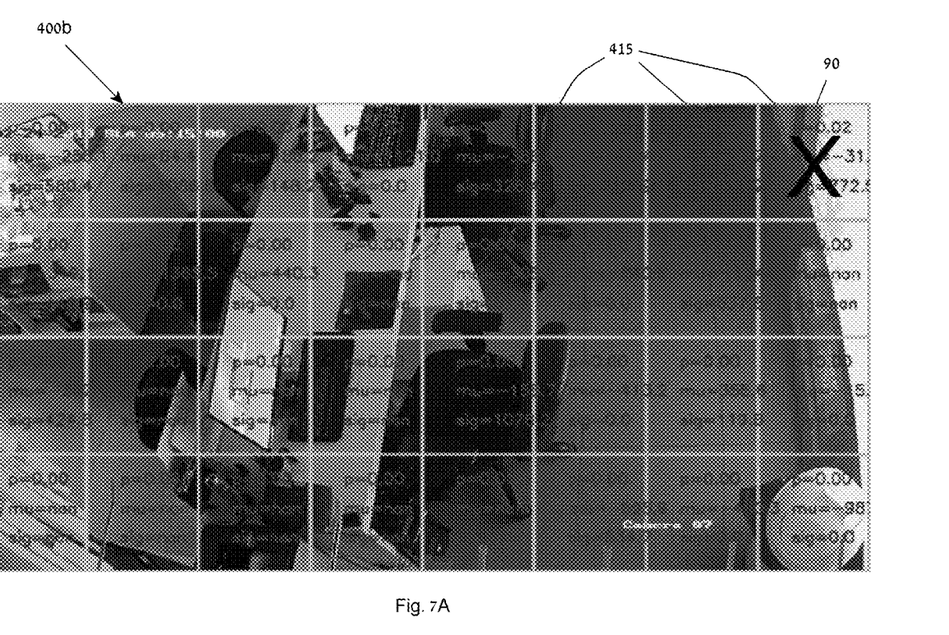
FIGS. 7A, 7B and 7C are greyscale image illustrations of exemplary sensor captured scenes of FODs of three respective sensors 30, captured by the three respective sensors, according to some embodiments of the present disclosure.
Figure 7B:
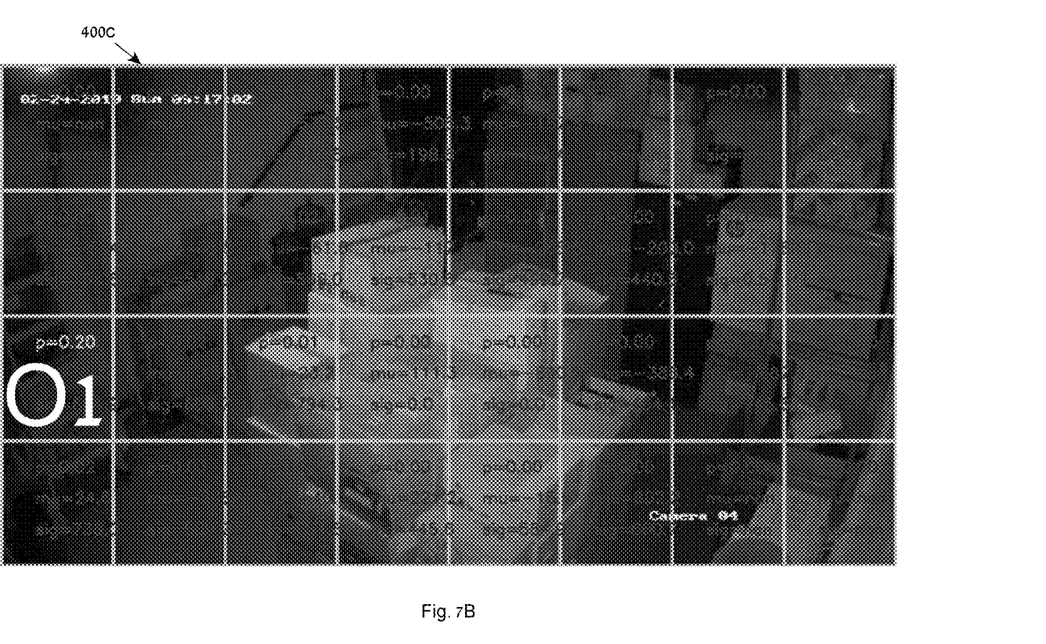
Figure 7C:
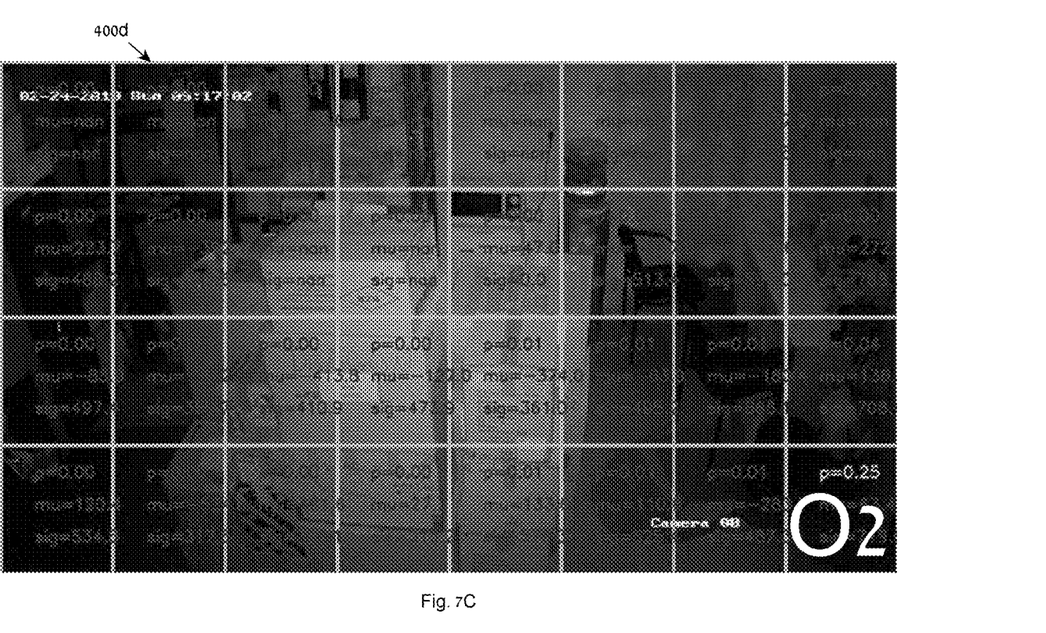

Reference is now made to FIGS. 7A, 7B and 7C, which are greyscale image illustrations of exemplary sensor captured scenes 400b, 400c and 400d of FODs of three respective sensors 30, captured by the three respective sensors 30, according to some embodiments of the present disclosure. In scene 400b, a section of interest is chosen, e.g. the section 415 marked by X. The section of interest may capture, for example, a door 90 leading to a storage room in site 50. Processor 10 may generate a correlation map for the section of interest. The correlation map includes an indication of the probability that a non-permanent object will reappear in a certain section 415 after disappearing in the section of interest. The indication may be for each of sections 415 in a plurality of scenes captured by corresponding sensors 30, such as scenes 400b, 400c and 400d. For each section 415, the map may include an indication of a most probable time and location in which the non-permanent object may reappear with the indicated probability, and/or of a statistical significance and/or a corresponding standard deviation of the time probability and/or of other spatiotemporal statistics.

For example, processor 10 may learn that a non-permanent object that disappeared from the section of interest marked by X, will most probably appear in a section marked by O1 in scene 400c and a section marked by O2 in scene 400d, which captures two respective FODs of two respective sensors placed in the storage room. For example, as shown in the example of FIGS. 7A-7C, processor 10 may learn that a non-permanent object that disappeared from section X will reappear in sections O1 and O2 with a probability of 0.2 and 0.25, respectively within a most likely timeframe. For example, section O1 and/or section O2 may capture an area adjacent to the door in the storage room. For example, the door is not in the FOD of the sensor capturing scene 400c or 400d. Processor 10 may learn about the high correlation within a timeframe between section X and sections O1 or O2 that capture areas at both sides of a door without relying on the visibility of the door. For example, processor 10 may learn that there is a very low probability that the object will reappear anywhere else in scenes 400a, 400b and 400c besides sections O1 and O2 and there is a specific timeframe in which the object is predicted to appear in each of the locations.

Returning to FIG. 2, it is indicated that in case the non-permanent object disappears from an FOD of a certain sensor 30, processor 10 may switch to monitoring the sensor 30 in whose FOD the object will most probably reappear, e.g. proceed to single sensor tracking in at least one FOD where the object will most probably reappear next.

Once switching to monitoring another FOD, processor 10 may identify that a non-permanent object located in the another FOD is the reappearing non-permanent object that disappeared from the previous FOD. While in single sensor tracking the representation of the non-permanent object usually changes gradually, in a multi-sensor setting the representation of the object, for example, visual appearance, may change drastically as the object is seen/sensed from different viewpoints/sensing points of the various sensors 30. Therefore, processor 10 may be required to identify objects from arbitrary viewpoints, scales and/or occlusions, for example by drastic appearance change tracking sub-module 26.

In some embodiments of the present invention, processor 10 and/or drastic appearance change tracking sub-module 26 may be trained to identify objects from various viewpoints, scales and occlusions by generating a visual discriminating model based on samples of same objects from various viewpoints, scales and occlusions. These samples may originate from private or publicly available datasets, either object-specific or otherwise. In some embodiments, processor 10 may be trained and/or generate the visual discriminating model by collecting data samples from the target site 50, for example by sensors 30. For example, based on the identified and/or calculated spatiotemporal correlations, processor 10 may extract the required samples. The samples can be further refined by other properties and cues such as number of simultaneous tracks, etc. For example, processor 10 may include convolutional neural networks that implement visual discrimination capabilities, for example, for re-identification of objects over different viewpoints.

Mapping and tracking module 20 may integrate and coordinate between single-sensor object tracking sub-module 22, overlapping areas identification sub-module 24, drastic appearance change tracking sub-module 26 and non-overlapping area mapping sub-module 28 to perform tracking across sensors 30. For example, given a selected non-permanent object tracked in a certain selected FOD captured scene by module 22, module 20 may score all other FOD captured scenes by integrating information of overlapping areas identified by module 24, correlated areas identified by module 28 and/or drastic appearance change by module 26. For example, module 20 may calculate a plurality of possible paths of the selected object across the various sensor captured FODs. For example, module 20 may calculate that a possible path includes certain sensor FODs in a certain chronological order, wherein it is probable that the selected object will be located in these certain FODs in the certain chronological order. For each possible path, module 20 may calculate a score according to the probability of the path, for example a higher score for a higher probability. For example, for each captured scene, module 20 may calculate a score for other captured scene according to the probability that the other scene will be next in a possible path of the selected object. The scoring process can be done iteratively, resulting in scored possible multi-sensor paths originating at the selected FOD. For example, the most probable path of the selected object across the multiple sensor may be provided as output by processor 10.

In some embodiments of the present disclosure, given a selected non-permanent object tracked in a selected captured scene in a selected time slot, processor 10 may identify non-permanent objects that appear simultaneously in the various FODs of the respective sensors 30, at the selected time slot and/or at other time slots before and/or after the selected time slot. Processor 10 may identify, for each of the time slots, detections of the selected non-permanent object, for example in an iterative process. Processor 10 may identify detections of the same selected object in the various time slots and FODs, for example by detecting simultaneous appearances of non-permanent objects that are either in overlapping regions between the selected FOD and other FODs in which the object is detected, or in a location of probable reappearance correlated with a previous FOD in which the object was detected, and/or that are identified as the same object according to visual appearance and/or other detected features.

In some embodiments of the present disclosure, processor 10 may identify, across the various time slots and FODs, non-permanent objects that crosses between spatiotemporal correlated FOD sections. In case of ambiguity, processor 10 may verify the identification of a crossing non-permanent object by matching the visual appearance or other detected features of identified objects.

Figure 8A:
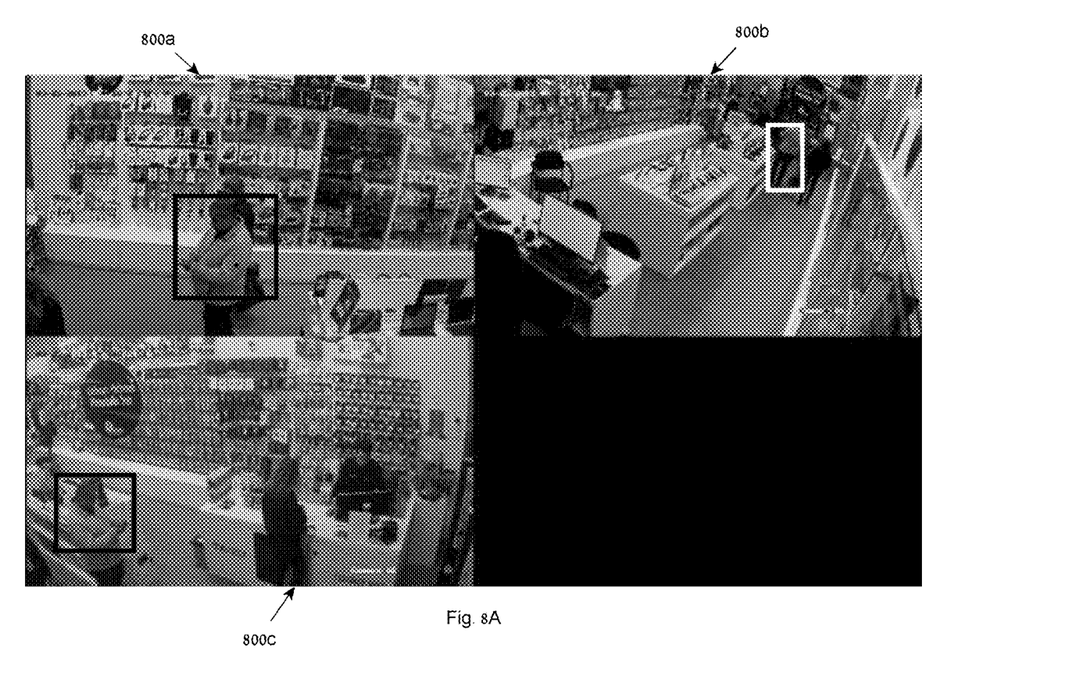
FIGS. 8A and 8B are greyscale images illustrating multi-camera tracking, according to some embodiments of the present disclosure.
Figure 8B:
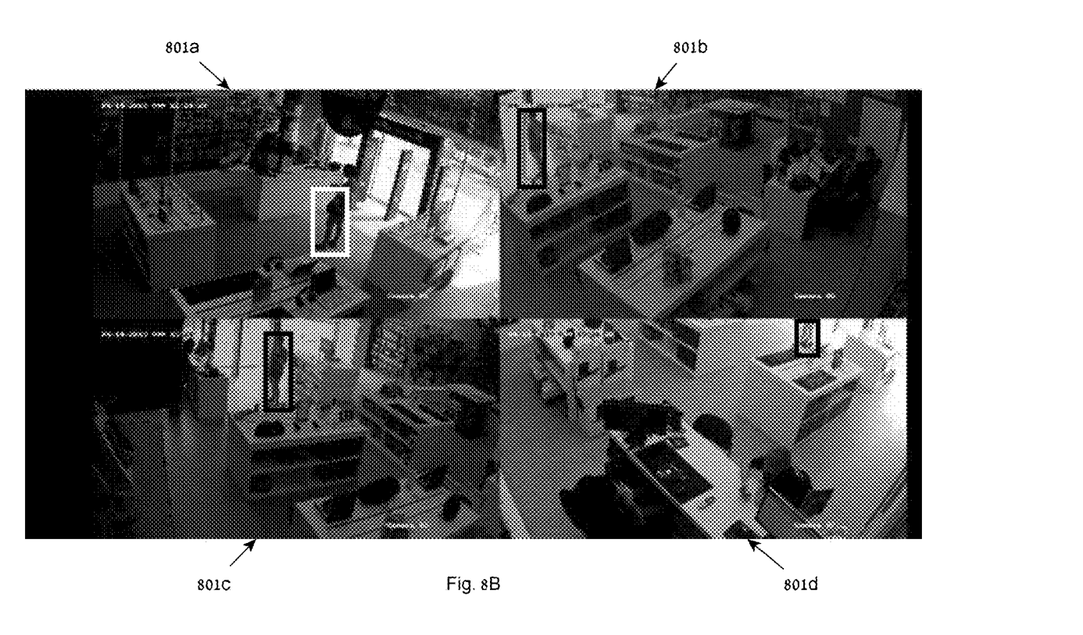

Reference is now made to FIGS. 8A and 8B, which are greyscale images illustrating multi-camera tracking, according to some embodiments of the present disclosure. FIG. 8A shows exemplary three FODs 800a, 800b and 800c, captured by three respective sensors 30. For example, a user may select a non-permanent object in FOD 800b, for example a human character, marked by a white-lined rectangle. Processor 10 may detect the same human character in other FODs 800a and 800c, for example in the same and/or in various time slots, the detections are marked by black-lined rectangles. FODs 800a and 800c may or may not include overlapping regions with FOD 800b. Similarly, FIG. 8B shows exemplary three FODs 801a, 801b, 801c and 801d, captured by four respective sensors 30. For example, a user may select a non-permanent object in FOD 801a, for example a human character, marked by a white-lined rectangle. Processor 10 may detect the same human character in other FODs 801b, 801c and 801d, for example in the same and/or in various time slots, the detections are marked by black-lined rectangles. FODs 801b, 801c and 801d may or may not include overlapping regions with FOD 801a.

In some embodiments of the present invention, processor 10 may control output device 16 to display the FODs in which the selected non-permanent object is located in each given moment, and switch between the FODs according to disappearances and appearances of objects in the various FODs. For example, in a given moment, processor 10 may control output device 16 to display FODs 801b, 801c and 801d in which the selected object is detected in a given moment. Once the object disappears from at least one of the displayed FOD, output device 16 may replace this at least one of the displayed FOD with the FOD where processor 10 predicts that the object will appear next.

Some embodiments of the present disclosure may include a system (hardware and/or software), a method, and/or a computer program product. The computer program product may include a tangible non-transitory computer readable storage medium (or media) having computer readable program instructions thereon for causing a processor to carry out aspects of the present disclosure. Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including any object oriented programming language and/or conventional procedural programming languages.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor, or a portable device such as a smart phone or a tablet computer, or a micro-processor, or a RISC processor, or a DSP, or a FPGA, or a GPU, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or electronic circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry. The processor and program may constitute the same apparatus, at least partially, such as an array of electronic gates, such as FPGA or ASIC, designed to perform a programmed sequence of operations, optionally comprising or linked with a processor or other circuitry.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprising", "including" and/or "having" and other conjugations of these terms, when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for multiple sensor calibration and tracking, the method comprising:
   identifying a non-permanent object in a first field of detection (FOD) of a sensor, wherein the sensor is one of a plurality of sensors positioned in various locations at a site, each sensor has a corresponding FOD;
   tracking the identified object by single-sensor tracking in the first FOD;
   learning to predict, in which FOD from at least one other FOD, an object will reappear after disappearing from a section of the first FOD, by:
   detecting when any non-permanent object disappears from a certain section of the first FOD;
   after the disappearance, detecting appearance of the same or another non-permanent object in at least one other section of the same or another FOD, within a certain range of time after the disappearance;
   counting, separately for each of the FOD sections, each time any non-permanent object appears in this FOD section within a certain range of time after any non-permanent object disappears from the certain section; and
   based on the counting, in case of high counts in a specific FOD section, identifying the specific FOD section as having high probability that any non-permanent object will reappear in this specific FOD section within the certain range of time after disappearing from the certain section;
   predicting based on the learning, in which FOD from the at least one other FOD, an object will reappear after disappearing from a section of the first FOD;
   based on the predictions, initiating single-sensor tracking in the at least one other FOD where it is predicted that the object will reappear; and
   outputting data captured from the tracked FODs.

2. The method of claim 1, wherein the predicting comprises predicting leaving the site by the identified object.

3. The method of claim 1, wherein the predicting comprises predicting appearance of the object in at least one other FOD that is overlapping with the first FOD.

4. The method of claim 1, comprising generating an alert in case the object does not appear in the predicted FODs within a predicted timeframe, or in case the object appears in unpredicted FODs or timeframe.

5. The method of claim 1, wherein in case the object disappears from the first FOD, predicting appearance of the object, and based on the prediction switch to single-sensor tracking in at least one other FOD where there is a high probability that the object will appear, and switching to outputting data captured from the tracked FODs.

6. The method of claim 1, comprising identifying the object in the second FOD by a module configured to identify non-permanent objects through noticeable appearance changes.

7. The method of claim 1, wherein the processor controls the sensors according to the appearance prediction.

8. The method of claim 7, wherein the controlling comprises at least one of a list consisting of: activating, deactivating, changing functionality, changing configuration and changing designation of a sensor.

9. The method of claim 1, comprising predicting by the mapping module where in the second FOD the object will reappear.

10. The method of claim 1, comprising predicting by the mapping module when the object will reappear.

11. The method of claim 1, comprising mapping the site based on object reappearance patterns, the mapping predicts if, when or where in the site an object will reappear after disappearing from a certain location in the site.

12. The method of claim 1, comprising:
    calculating a plurality of possible paths of the non-permanent object across the various FODs, the path includes certain sensor FODs in a certain chronological order, wherein it is probable that the selected object will be located in these certain FODs in the certain chronological order; and
    calculating a score for each calculated path, according to the probability of the object making this path.

13. The method of claim 10, comprising iteratively calculating for each FOD section a score for other FOD sections according to the probability that the other FOD sections will be next in a possible path of the object.

14. The method of claim 1, comprising identifying overlapping areas between the FODs.

15. The method of claim 1, comprising counting when a non-permanent object is detected in two FODs at the same time, and identifying as overlapping areas, areas covered by respective two sections of the two FODs having high counts of simultaneous detections of non-permanent objects.

16. The method of claim 1, comprising:
    given a selected non-permanent object tracked in a selected FOD in a selected time slot, identifying the same or other non-permanent objects that appear simultaneously in other FODs, at the selected time slot and/or at other time slots before and/or after the selected time slot; and
    identifying if the same or other non-permanent objects are the same selected non-permanent object.

17. The method of claim 11, comprising detecting simultaneous appearances of non-permanent objects that are either:
    in overlapping regions between the selected FOD and other FODs in which the object is detected; or
    in a location of probable reappearance correlated with a previous FOD in which the object was detected; or
    that are identified as the same object according to detected features.

18. The method of claim 11, comprising:
    identifying non-permanent objects that cross between spatiotemporal correlated FOD sections; and
    verifying the identification of the crossing non-permanent objects by matching the detected features of identified objects.

* * * * *